United States Patent [19]
Kudo et al.

[11] Patent Number: 5,682,245
[45] Date of Patent: Oct. 28, 1997

[54] MICROSCOPIC PHOTOMETRY APPARATUS

[75] Inventors: Seishi Kudo, Tsukuba; Hiroshi Suzuki, Fujisawa; Mikio Aoshima, Yokohama, all of Japan

[73] Assignees: Research Development Corporation of Japan; Yasukawa Electric Corporation; Nikon Engineering Co., Ltd., all of, Japan

[21] Appl. No.: 613,883

[22] Filed: Mar. 11, 1996

[30] Foreign Application Priority Data

Mar. 10, 1995 [JP] Japan .................. 7-050755

[51] Int. Cl.⁶ .................. G01N 21/84; G02B 21/00
[52] U.S. Cl. .................. 356/444; 359/368
[58] Field of Search .................. 356/444, 218, 356/213; 359/368, 384, 434, 831, 834, 835, 836

[56] References Cited

U.S. PATENT DOCUMENTS

| | | | |
|---|---|---|---|
| 3,614,310 | 10/1971 | Korpel | 178/6.8 |
| 4,014,612 | 3/1977 | Atwood et al. | 356/88 |
| 4,054,387 | 10/1977 | Whittome | 356/156 |
| 4,303,340 | 12/1981 | Hoffman | 356/372 |
| 4,657,356 | 4/1987 | Matsumura | 350/516 |
| 4,702,570 | 10/1987 | Yoshino et al. | 359/384 |
| 4,705,403 | 11/1987 | Eguchi et al. | 356/319 |
| 4,790,663 | 12/1988 | Faltermeier et al. | 356/342 |
| 4,796,999 | 1/1989 | Schuster et al. | 356/394 |

OTHER PUBLICATIONS

Nature, vol. 346, No. 6285, pp. 677–680, 16 Aug. 1990.

*Primary Examiner*—David C. Nelms
*Assistant Examiner*—Zandra V. Smith
*Attorney, Agent, or Firm*—Lorusso & Loud

[57] ABSTRACT

In a microscopic photometry apparatus having an optical system for photometry and an optical system for observation, there are provided a mirror having a slit for photometry, a photodetector for receiving light from the slit for photometry, a TV camera for observing an image of a sample reflected by the mirror, an image translating mechanism for translating the image of the sample, and an image rotating mechanism for rotating the image of the sample. Photometry is performed for an arbitrary position within the image of the sample by translating and rotating the image while simultaneously observing the slit for photometry and the image of the sample. Therefore, it is possible to easily and accurately perform observation and/or measurement for a microscopic object or a microscopic part of a macroscopic object, including photometry for arbitrary two points.

3 Claims, 10 Drawing Sheets

MICROSCOPIC PHOTOMETRY APPARATUS

BACKGROUND OF THE INVENTION

1. Field of the Invention

The present invention relates to a microscopic photometry apparatus for observing light emission or scattered light from a microscopic object or part of a macroscopic object, and particularly to a microscopic photometry apparatus for accurately and easily performing such observation at one or two points on a sample. The present invention also relates to a two-channel laser dark-field microscopic photometry apparatus capable of carrying out sophisticated analyses of motion of a very small object such as rotation of bacterial flagella.

2. Description of the Related Art

In a conventional microscopic photometry apparatus, two methods have been employed so as to obtain information from a specific portion of an image of a sample. In one method, the intensity of light at the approximate center of the field of view is simply measured. In the other method, a portion to be measured (hereinafter referred to as a "measuring portion") is determined by moving a sample stage while observing both a slit through which light enters a photodetector and an image of a sample (see Japanese Patent Application Laid-Open (kokai) No. 3-257349, for example).

The former method has the drawback that it is difficult to accurately determine a measuring portion. Although the latter method can avoid such a drawback, it has the drawbacks that some experience is needed to determine a measuring portion by moving the stage, and that the positional relationship between illumination light and a sample varies when moving the sample. Further, it has proven difficult to realize a measurement in which photometry is simultaneously performed for two points in an image by providing two photometry systems, because it has proven practically impossible to align each measuring portion with a slit for photometry without using a mechanism for moving the photometry system.

There are cases in which a laser is used as an illumination light source of a microscopic photometry apparatus instead of a halogen lamp or a mercury lamp which are generally used. An example of such a microscopic photometry apparatus using a laser is a laser dark-field microscopic photometry apparatus disclosed in Japanese Patent Application Laid-Open (kokai) No. 3-257349. This microscopic photometry apparatus is used to measure motion of a very small object such as a flagellum of a bacterium. However, since this apparatus can measure rotation of only a single flagellum at a time, only limited information can be obtained.

If a laser beam is irradiated onto two flagella so as to measure rotation of these two flagella, the flagella cannot be illuminated from a direction suitable for measurement, because the arrangement of flagella differs sample by sample.

Moreover, in the above-described conventional microscopic photometry apparatus, it is difficult to accurately determine a measuring portion because the apparatus employs a method in which the measuring position is determined by moving the sample stage.

SUMMARY OF THE INVENTION

An object of the present invention is to solve the above-mentioned problems in conventional microscopic photometry apparatuses, and to provide a microscopic photometry apparatus in which observation and/or measurement for a microscopic object or a microscopic part of a macroscopic object, including photometry for arbitrary two points, can be performed easily and accurately by translating and rotating an image of a sample while simultaneously observing a slit for photometry and the image of the sample.

To achieve the above object, the present invention provides a microscopic photometry apparatus which comprises an optical system for photometry and an optical system for observation, and further comprises translation/rotation means for translating and rotating an image of a sample, and photometry means for performing photometry for an arbitrary position within the image of the sample by translating and rotating the image by the translation/rotation means.

The present invention also provides a microscopic photometry apparatus which comprises an optical system for photometry and an optical system for observation, and further comprises a mirror having a slit for photometry, a photodetector for receiving light from the slit for photometry, observation means for observing an image of a sample reflected by the mirror, an image translating mechanism for translating the image of the sample, and an image rotating mechanism for rotating the image of the sample.

Photometry is performed for an arbitrary position within the image of the sample by translating and rotating the image while observing the slit for photometry and the image of the sample simultaneously.

The present invention further provides a microscopic photometry apparatus which comprises an optical system for photometry and an optical system for observation, and further comprises two photometry/observation systems. Each photometry/observation system includes a mirror having a slit for photometry, a photodetector for receiving light from the slit for photometry, observation means for observing an image of a sample reflected by the mirror, an image translating mechanism for translating the image of the sample, and an image rotating mechanism for rotating the image of the sample.

Photometry is performed not only for a single point but also simultaneously performed for two selected points.

In this case, it is preferred that two laser beams are simultaneously introduced into a dark-field condenser as illumination light so as to illuminate two very small objects separately, thereby making it possible to simultaneously measure scattered light from the two very small objects.

In this case, it is also preferred that an optical path rotating mechanism is provided at a laser beam introducing section so as to illuminate a sample at an arbitrary angle in a plane in which the sample exists.

According to the present invention, the following effects can be obtained.

(1) Photometry can be performed for an arbitrary position within an image of a sample by translating and rotating the image while simultaneously observing the slit for photometry and the image of the sample.

(2) Since two photometry/observation systems each having a mechanism for translating and rotating an image are provided, in addition to photometry for a single point, simultaneous photometry can be performed for two different points selected within an image. Further, this selection of points can be performed accurately and easily.

(3) In the case where two laser beams are simultaneously introduced into a dark-field condenser as illumination light for the microscopic photometry apparatus having two photometry/observation systems, it becomes possible to illuminate two very small objects separately for simultaneous measurement of scattered light from the two objects. Therefore, it is possible to increase the amount of information obtained through measurement for very small objects such as flagella of a bacterium.

(4) In the case where an optical path rotating mechanism is provided at a laser beam introducing section, it is possible to illuminate a sample at an arbitrary angle in a plane in which the sample exists.

As described above, it becomes possible to easily and accurately perform observation and/or measurement for a microscopic object or a microscopic part of a macroscopic object, including photometry for arbitrary two points. Especially, when two laser beams are used as light sources for dark-field illumination, it becomes possible to perform a sophisticated measurement such as simultaneous measurement of rotation of two flagella of a single bacterial cell.

DESCRIPTION OF THE PREFERRED EMBODIMENTS

Embodiments of the present invention will next be described in detail with reference to the drawings.

Figure 1:
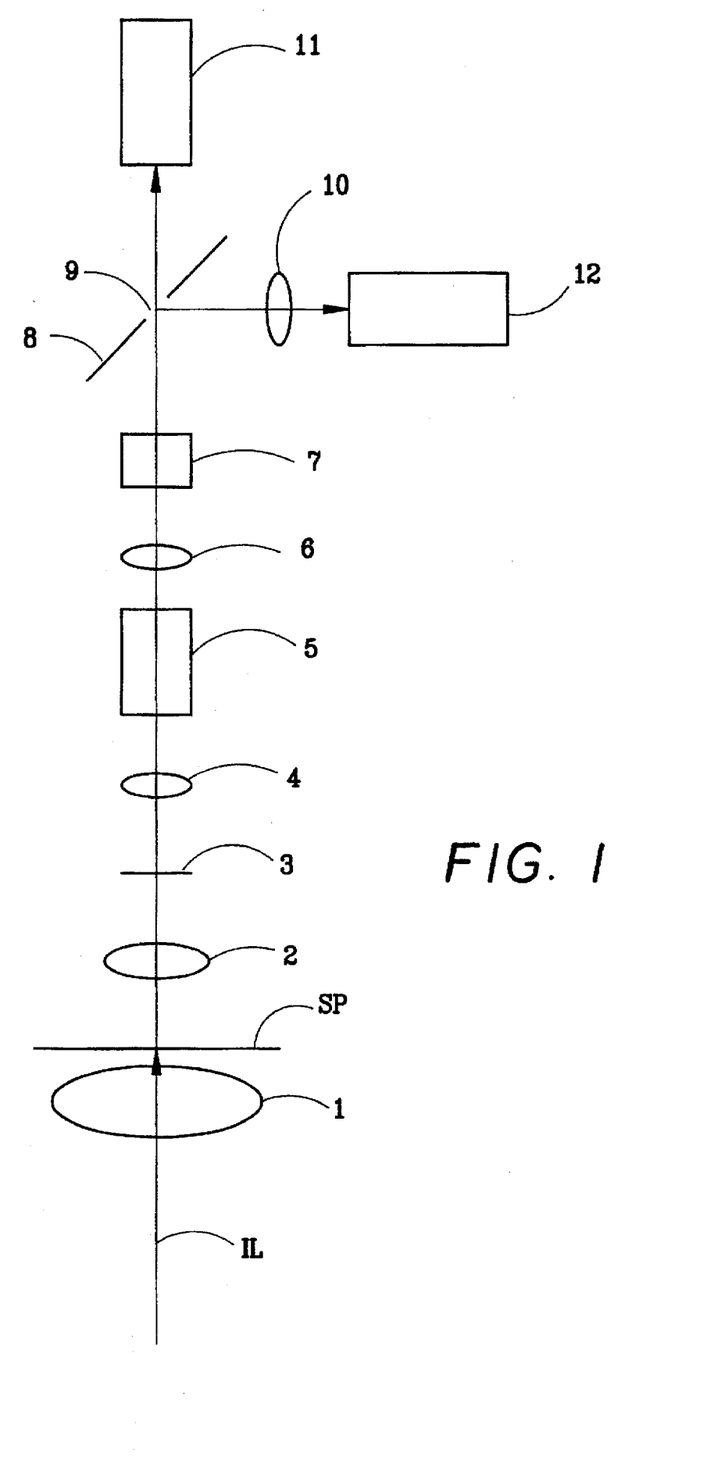
FIG. 1 is a diagram showing the structure of a microscopic photometry apparatus according to a first embodiment of the present invention, in which a mechanism for translating and rotating an image is provided.

FIG. 1 is a diagram showing the structure of a microscopic photometry apparatus according to a first embodiment of the present invention, in which a mechanism for translating and rotating an image is provided.

In FIG. 1, symbol IL denotes illumination light, symbol SP denotes a sample, numeral 1 denote a condenser, numeral 2 denotes an objective lens, numeral 3 denotes an intermediate image of the sample SP, numeral 4 denotes a relay lens A, numeral 5 denotes an image rotating mechanism, numeral 6 denotes a relay lens B, numeral 7 denotes an image translating mechanism, numeral 8 denotes a mirror with a slit for photometry (hereinafter simply referred to as a "mirror with a slit"), numeral 9 denotes a slit for photometry (hereinafter simply referred to as a "slit"), numeral 10 denotes a relay lens C, numeral 11 denotes a photodetector, and numeral 12 denotes a TV camera.

As shown in FIG. 1, an image of the sample SP is focused on the slit 9, and the intensity of light passing through the slit 9 is measured by the photodetector 11 such as a photomultiplier tube. The position of the image can be varied by the image translating mechanism 7, while the orientation of the image can be varied by the image rotating mechanism 5. Since the slit 9 is surrounded by the mirror 8, light excepting the portion thereof passing through the slit 9 reaches the TV camera 12 via the relay lens C 10. Both the slit 9 and the image of the sample SP can be monitored by the TV camera 12.

This structure makes it possible to accurately determine a portion of a image from which light is received for measurement by translating and rotating the image of the sample SP. A structure may be employed which has either the image translating mechanism or the image rotating mechanism, for example, only the image translating mechanism. This structure makes it possible to carry out a simpler measurement which can avoid the drawback of conventional methods.

Figure 2:
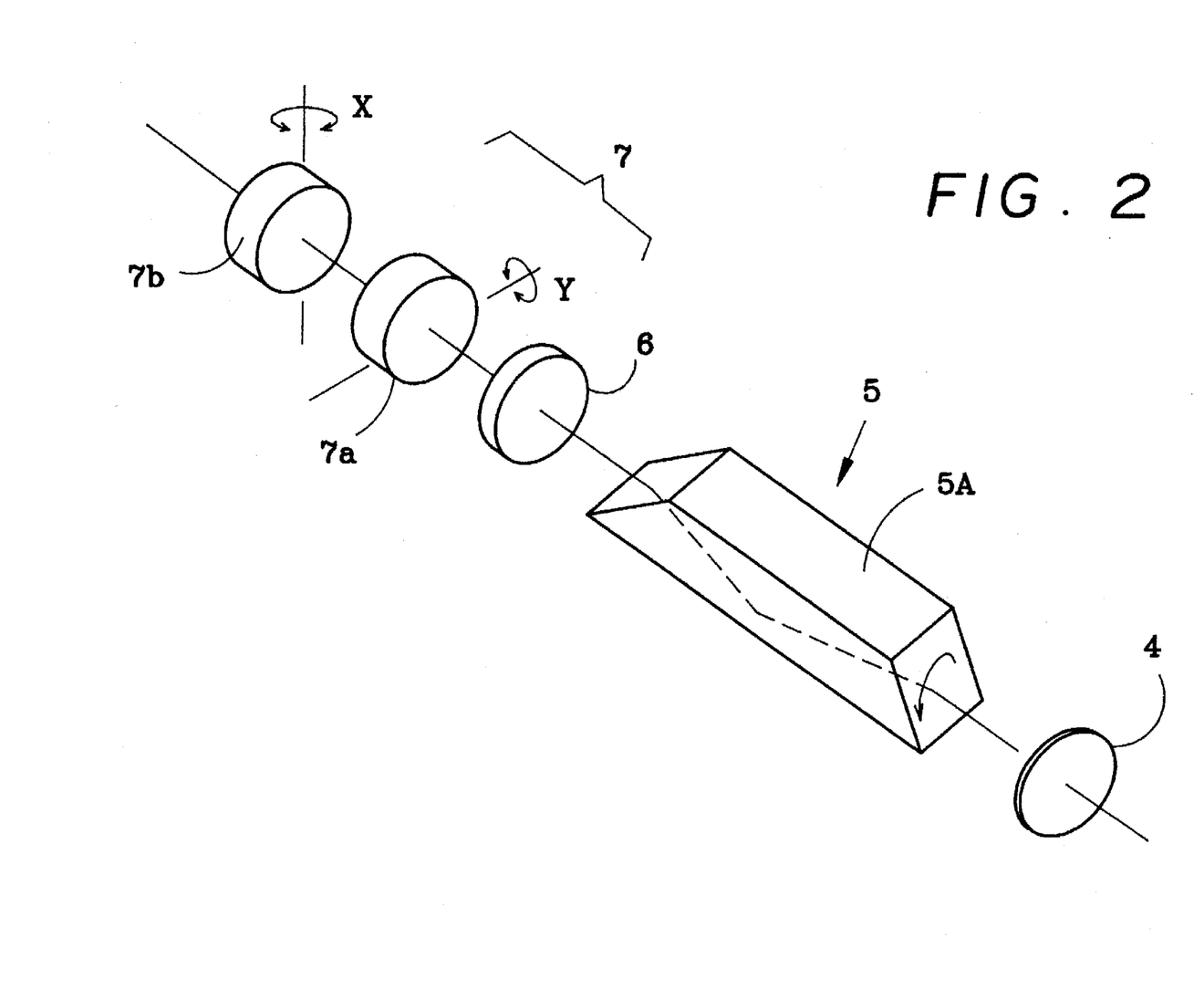
FIG. 2 is a diagram showing an image translating mechanism and an image rotating mechanism used in the microscopic photometry apparatus according to the first embodiment of the present invention.

FIG. 2 is a diagram showing the image translating mechanism and the image rotating mechanism of the microscopic photometry apparatus according to the first embodiment of the present invention.

As shown in FIG. 2, the image translating mechanism 7 includes a pair of plane-parallel glasses 7a and 7b which are disposed perpendicular to the optical axis. The glasses 7a and 7b are supported such that their angular positions about respective axes (Y-axis, X-axis) perpendicular to the optical axis can be varied. The image of the sample SP can be moved in any direction on a plane passing through the slit 9 and perpendicular to the optical axis by changing the angular positions of the plane-parallel glasses 7a and 7b of the image translating mechanism 7. An amount of movement δ of an image with respect to each of the X and Y axes can be expressed as follows:

$$\delta = d \sin u \{1 - [\cos u / \sqrt{(n^2 - \sin^2 u)}]\}$$

wherein d is the thickness of the plane-parallel glass, n is the refractive index, and u is an angular change. Accordingly, the image can be substantially moved by a small change of u in the angular position if the thickness d of the plane-parallel glass and the refractive index n are properly determined.

The image rotating mechanism 5 includes a Dove prism 5A which is disposed such that its longitudinal axis becomes parallel to the optical axis and such that it is rotatable around the optical axis. By rotating the Dove prism 5A, the image can be rotated in an arbitrary direction around the optical axis. The amount of rotation of the image is double the amount of rotation of the Dove prism 5A.

The layout of the image rotating mechanism 5 and the image translating mechanism 7 will be described in the following second embodiment.

By providing the above-described mechanism, it becomes possible to realize smooth translation and rotation of the image of the sample SP. Accordingly, measuring operation can be performed more accurately and more easily compared to the case where a measuring portion is determined by translating and rotating the sample stage.

Figure 3:
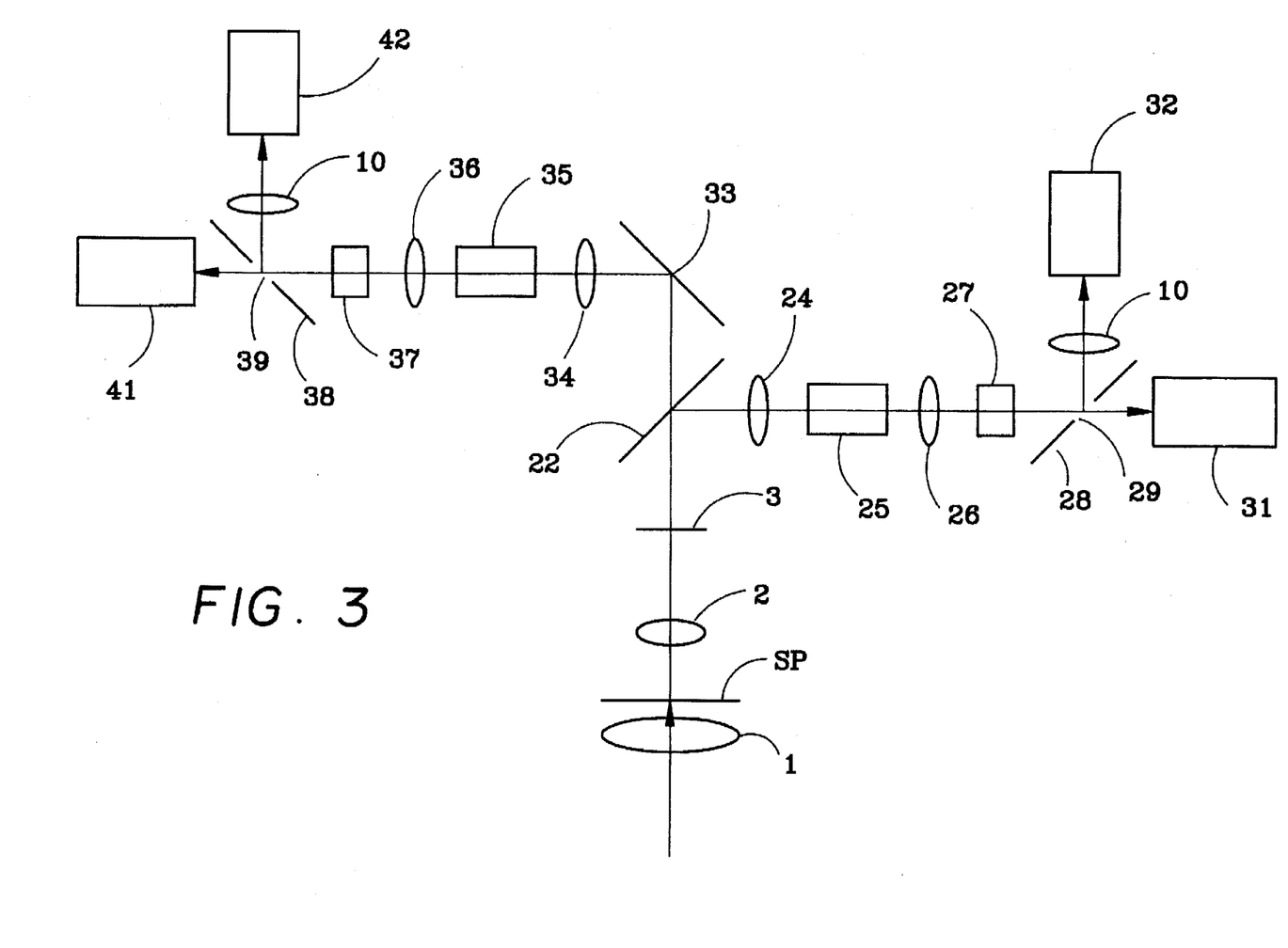
FIG. 3 is a diagram showing the structure of a two-channel microscopic photometry apparatus according to a second embodiment of the present invention, in which an image translating mechanism and an image rotating mechanism are provided.

FIG. 3 is a diagram showing the structure of a two-channel microscopic photometry apparatus according to a second embodiment of the present invention, in which an image translating mechanism and an image rotating mechanism are provided. Portions identical to those of the first embodiment are denoted by the same reference symbols and numerals, and a description therefor will be omitted.

The microscopic photometry apparatus of the present embodiment can be obtained by modifying the microscopic photometry apparatus of the first embodiment to have two channels.

In FIG. 3, numeral 22 denotes a half mirror (or a half prism), numeral 24 denotes a first relay lens A, numeral 25 denotes a first image rotating mechanism, numeral 26 denotes a first relay lens B, numeral 27 denotes a first image translating mechanism, numeral 28 denotes a first mirror with a slit, numeral 29 denotes a first slit, numeral 31 denotes a first photodetector, and numeral 32 denotes a first TV camera.

These components constitute a first photometry/observation system. Numeral 33 denotes a mirror, numeral 34 denotes a second relay lens A, numeral 35 denotes a second image rotating mechanism, numeral 36 denotes a second relay lens B, numeral 37 denotes a second image translating mechanism, numeral 38 denotes a second mirror with a slit, numeral 39 denotes a second slit, numeral 41 denotes a second photodetector, and numeral 42 denotes a second TV camera. These components constitute a second photometry/observation system.

As described above, two photometry/observation systems each including an image translating mechanism, an image rotating mechanism, a mirror with a slit, a photodetector and a TV camera are provided. Also, the half mirror (or a half prism) 22 is provided so as to distribute an image of a sample SP to each photometry/observation system. When a half mirror is used, the same field of view can be observed by the TV camera of each photometry/observation system. This facilitates the operation of observing respective measuring portions. However, when the amount of light is limited, an edge of a rectangular prism, for example, is used instead of the half mirror, so as to distribute each half of the image to each photometry/observation system. Also, it is possible to employ a structure in which a dichroic mirror is used instead of the half mirror for separation of optical path depending on wavelengths of light.

Figure 4:
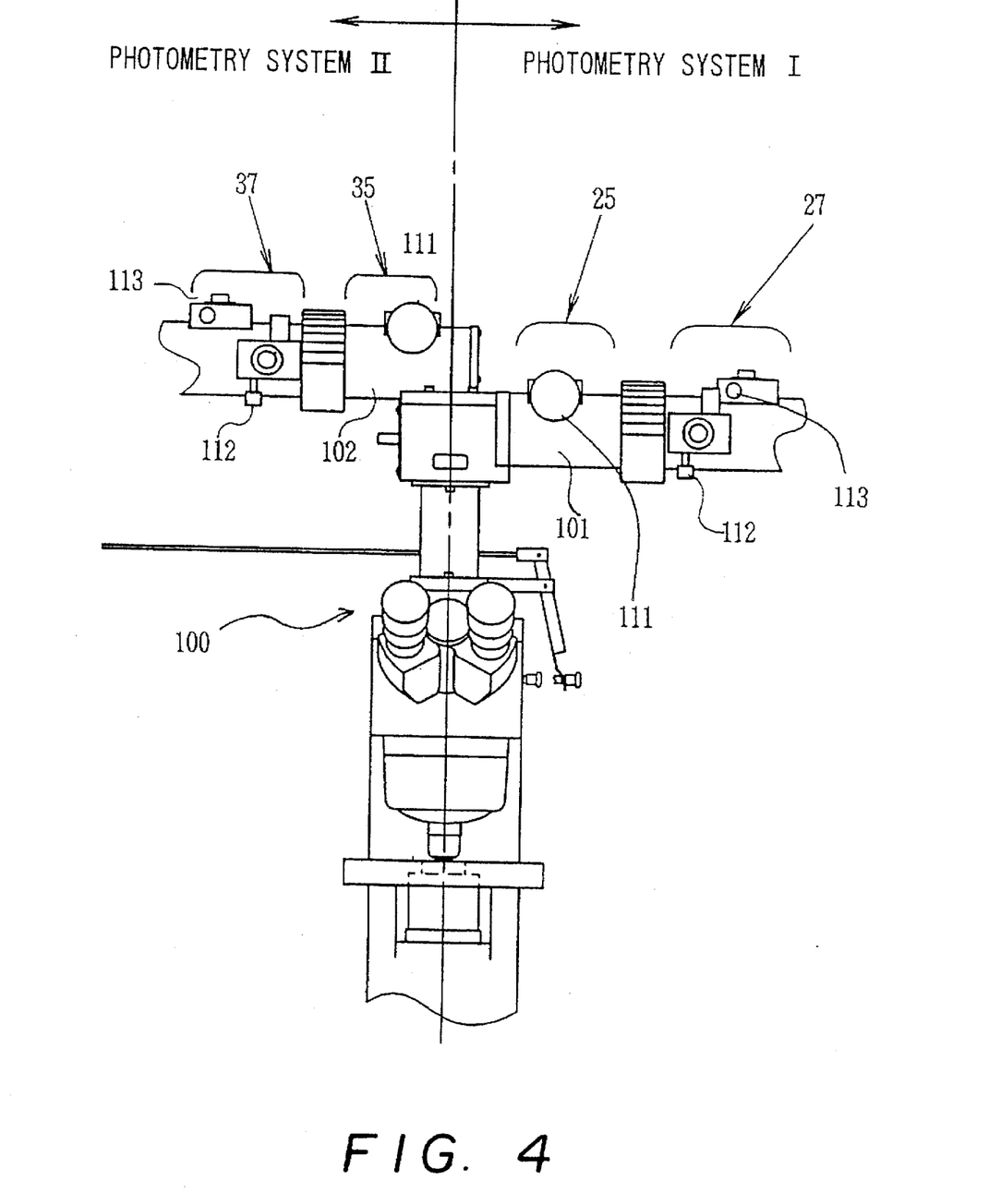
FIG. 4 is a partial view showing the layout of the image translating mechanism and the image rotating mechanism of the microscopic photometry apparatus according to the second embodiment of the present invention.
Figure 5:
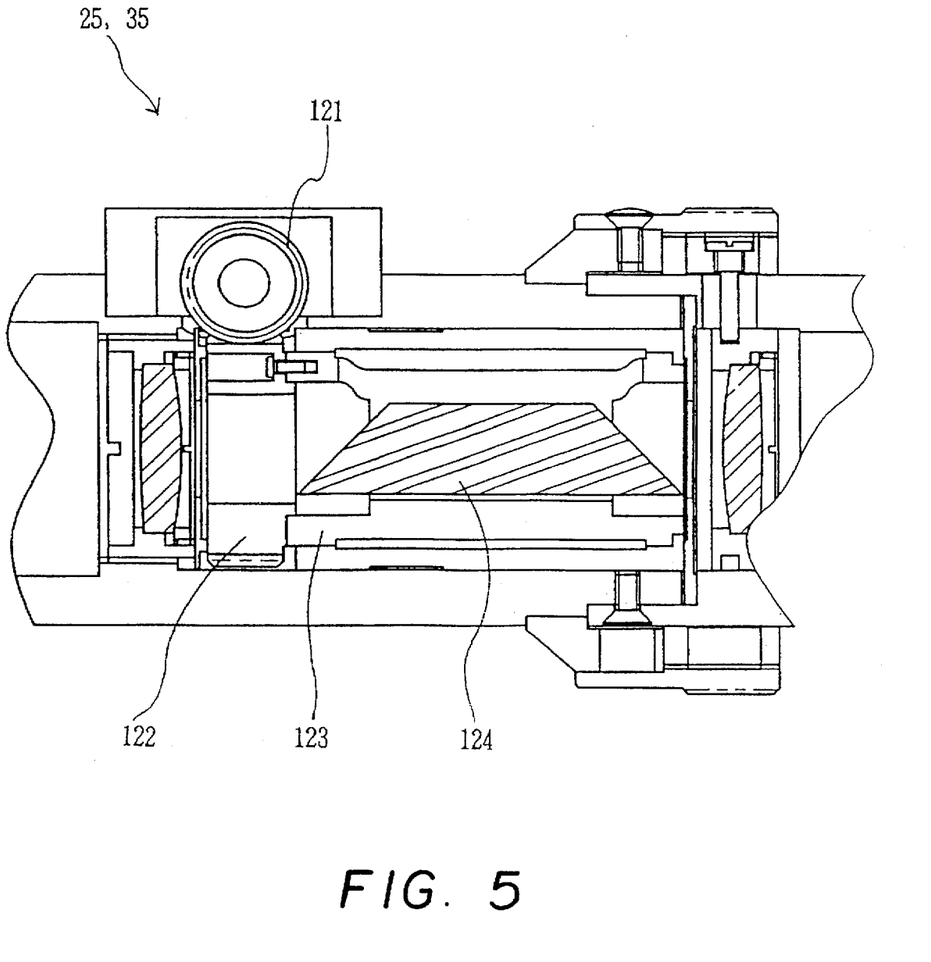
FIG. 5 is a view showing the image rotating mechanism of the microscopic photometry apparatus according to the second embodiment of the present invention.
Figure 6A:
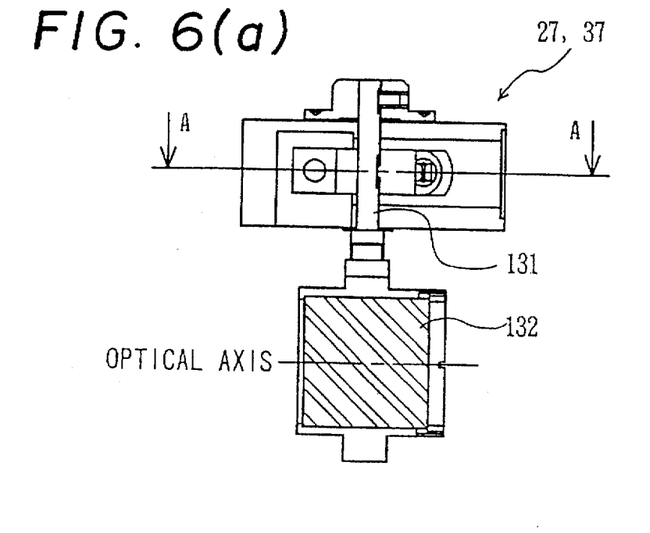
FIGS. 6(a)–6(c) are views showing the image translating mechanism of the microscopic photometry apparatus according to the second embodiment of the present invention.
Figure 6B:
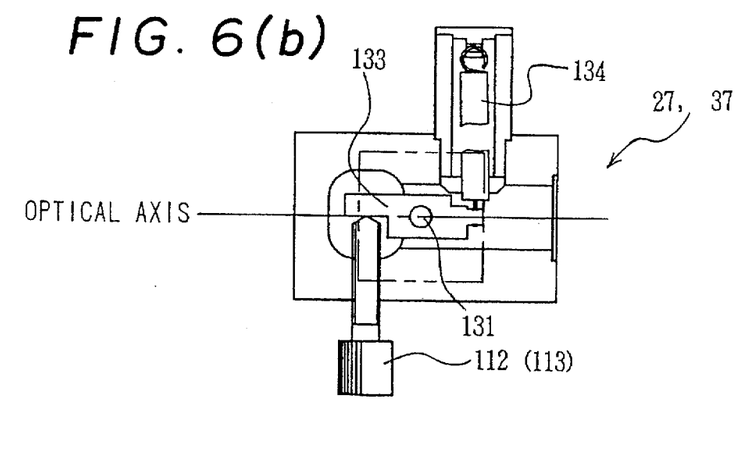
Figure 6C:
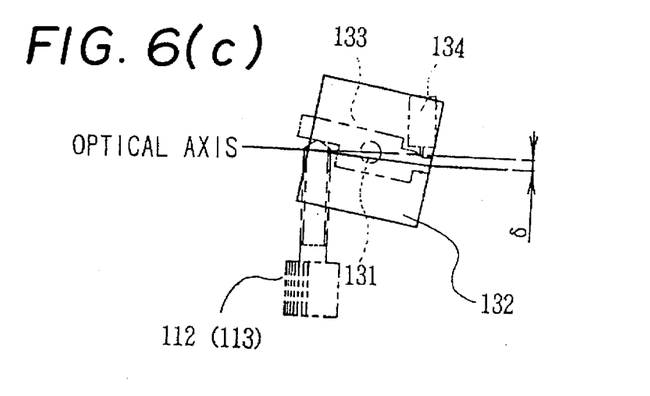

FIG. 4 is a partial view showing the layout of the image translating mechanism and the image rotating mechanism of the microscopic photometry apparatus according to the second embodiment of the present invention, FIG. 5 is a view showing the image rotating mechanism of the microscopic photometry apparatus according to the second embodiment of the present invention, and FIGS. 6(a)–6(c) are views showing the image translating mechanism of the microscopic photometry apparatus according to the second embodiment of the present invention. FIG. 6(a) is a view showing the structure of part of the image translating mechanism, FIG. 6(b) is a sectional view taken along line A—A in FIG. 6(a), and FIG. 6(c) is a view showing a state in which the image translating mechanism has been operated for moving an image.

As shown in FIG. 4, the first image rotating mechanism 25 and the first image translating mechanism 27 are disposed on a tube 101 which extends on the right side (photometry/observation system I) of a microscope body 100. Symmetrically with this, the second image rotating mechanisms 35 and the second image translating mechanism 37 are disposed on a tube 102 which extends on the left side (photometry/observation system II) of the microscope body 100. The first and second image rotating mechanisms 25 and 35 are provided with image rotating handles 111, while the first and second image translating mechanisms 27 and 37 are provided with image moving screw 112 and 113 for moving an image in the top and down direction and in the right and left direction in the field of view.

As shown in FIG. 5, each of the first and second image rotating mechanisms 25 and 35 comprises a worm 121, a wheel 122, an internal tube 123, and a Dove prism 124. When the image rotating handle 111 (see FIG. 4) is rotated one turn, the worm 121 directly connected to the handle 111 is rotated by one turn. This one turn of the worm 121 causes a half turn of the wheel 122 meshed with the worm 121. When the wheel 122 rotates a half turn, the internal tube 123 directly connected to the wheel 122 rotates a half turn. With this operation, the Dove prism 124 held by the internal tube 123 rotates a half turn, and an image rotates one turn. Since the rotational direction of the image rotating handle 111 must coincide with the rotational direction of a monitored image, the worm and the wheel in the photometry/observation system I have teeth twisted in a direction opposite to the twist direction of the worm and the wheel in the photometry/observation system II.

As shown in FIGS. 6(a) and 6(b), each of the first and second image translating mechanisms 27 and 37 comprises an image moving screw 112 or 113, a rotary shaft 131, a plane-parallel glass 132, a lever 133, and an urging spring 134. When the image moving screw 112 or 113 is rotated, the image moving screw 112 or 113 linearly moves, so that the lever 133 contacting the image moving screw 112 or 113 slightly rotates around the rotary shaft 131. Since the lever 133, the rotary shaft 131 and the plane-parallel glass 132 are integrated as a single unit, the plane-parallel glass 132 slightly rotates as the lever 133 rotates.

Since the incident angle of light entering the plane-parallel glass 132 varies, the luminous flux is translated in parallel by an amount δ in accordance with the refractive index of the plane-parallel glass 132, as shown in FIG. 6(c).

Each image translating mechanism includes a unit for movement in the right and left direction and a unit for movement in the top and down direction, which are the same units and are disposed around the optical axis with an angular offset of 90 therebetween. This pair of units of the image translating mechanism are disposed in each of the photometry/observation systems I and II symmetrically.

As described above, by providing a mechanism for translating and rotating an image in a two channel microscopic photometry apparatus, it becomes possible to perform photometry for arbitrary two points on a sample SP, which was impossible to be performed by moving the sample stage only.

Figure 7:
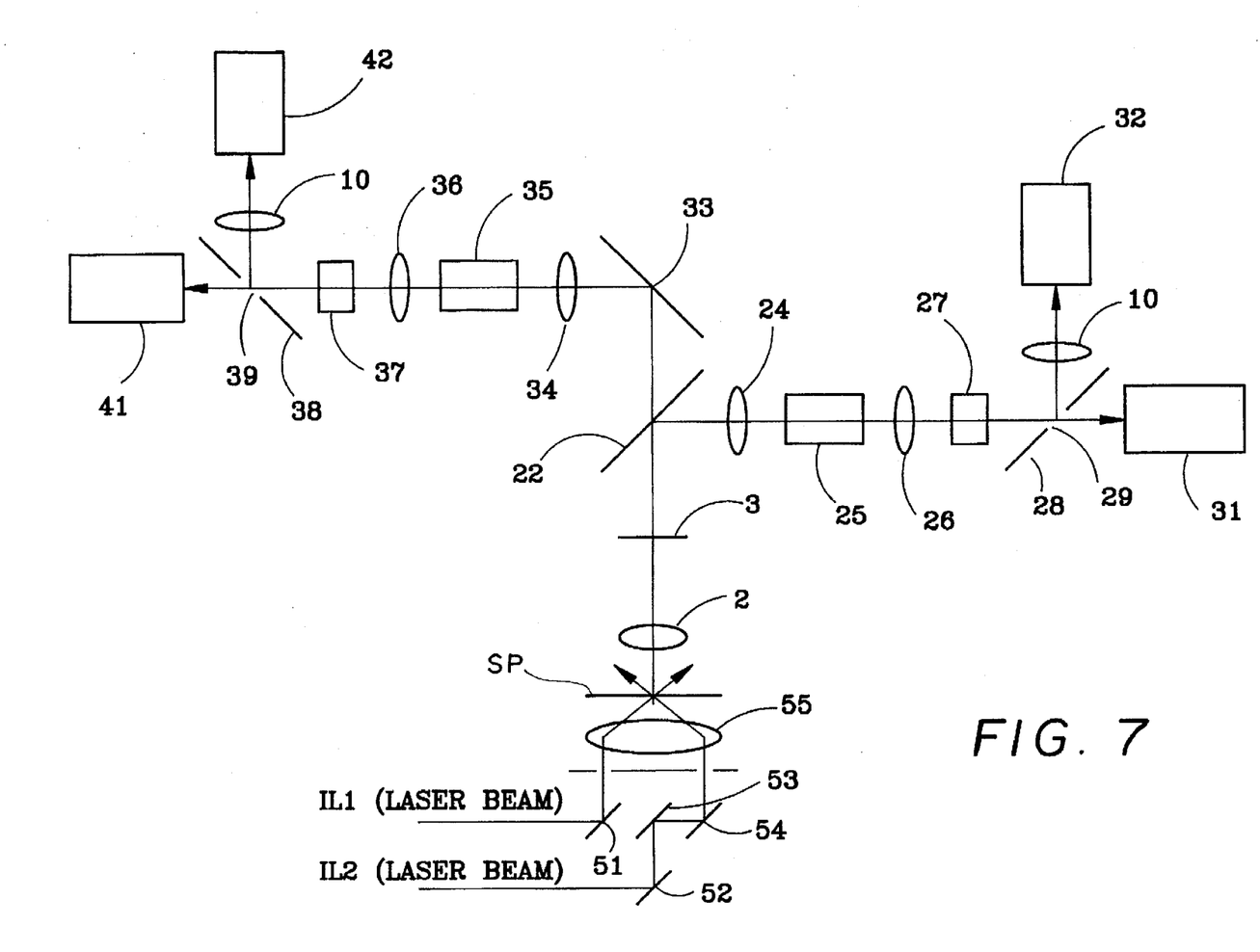
FIG. 7 is a diagram showing the structure of a two-channel microscopic photometry apparatus with laser illumination according to a third embodiment of the present invention, in which an image translating mechanism, an image rotating mechanism and an optical path rotating mechanism are provided.

FIG. 7 is a diagram showing the structure of a two-channel microscopic photometry apparatus with laser illumination according to a third embodiment of the present invention, in which an image translating mechanism, an image rotating mechanism and an optical path rotating mechanism are provided. Portions identical to those of the second embodiment are denoted by the same reference symbols and numerals, and a description therefor will be omitted.

In FIG. 7, symbol IL1 denotes first illumination light (a first laser beam in this embodiment), symbol IL2 denotes second illumination light (a second laser beam in this embodiment), numeral 51 denotes a first mirror for reflecting the first laser beam, numeral 52 denotes a second mirror for reflecting the second laser beam, numeral 53 denotes a third mirror, numeral 54 denotes a fourth mirror, and numeral 55 denotes a dark-field condenser.

The present embodiment shows an example in which a dark-field condenser is disposed in a two-channel microscopic photometry apparatus and laser beams are used as a light source, thereby obtaining a two-channel laser dark-field microscope.

When a sample SP is illuminated using the two laser beams IL1 and IL2, it is desired to provide the illumination from an arbitrary direction. Therefore, one of the two laser beams can change its incident direction. That is, the third mirror 53 and the fourth mirror 54 are simultaneously rotated around the optical axis of the microscope so as to rotate the incident optical path of the laser beam along an annular incident slit of the dark-field condenser 55. With this operation, the direction of illumination in the plane in which the sample SP exists can be changed.

Figure 8:
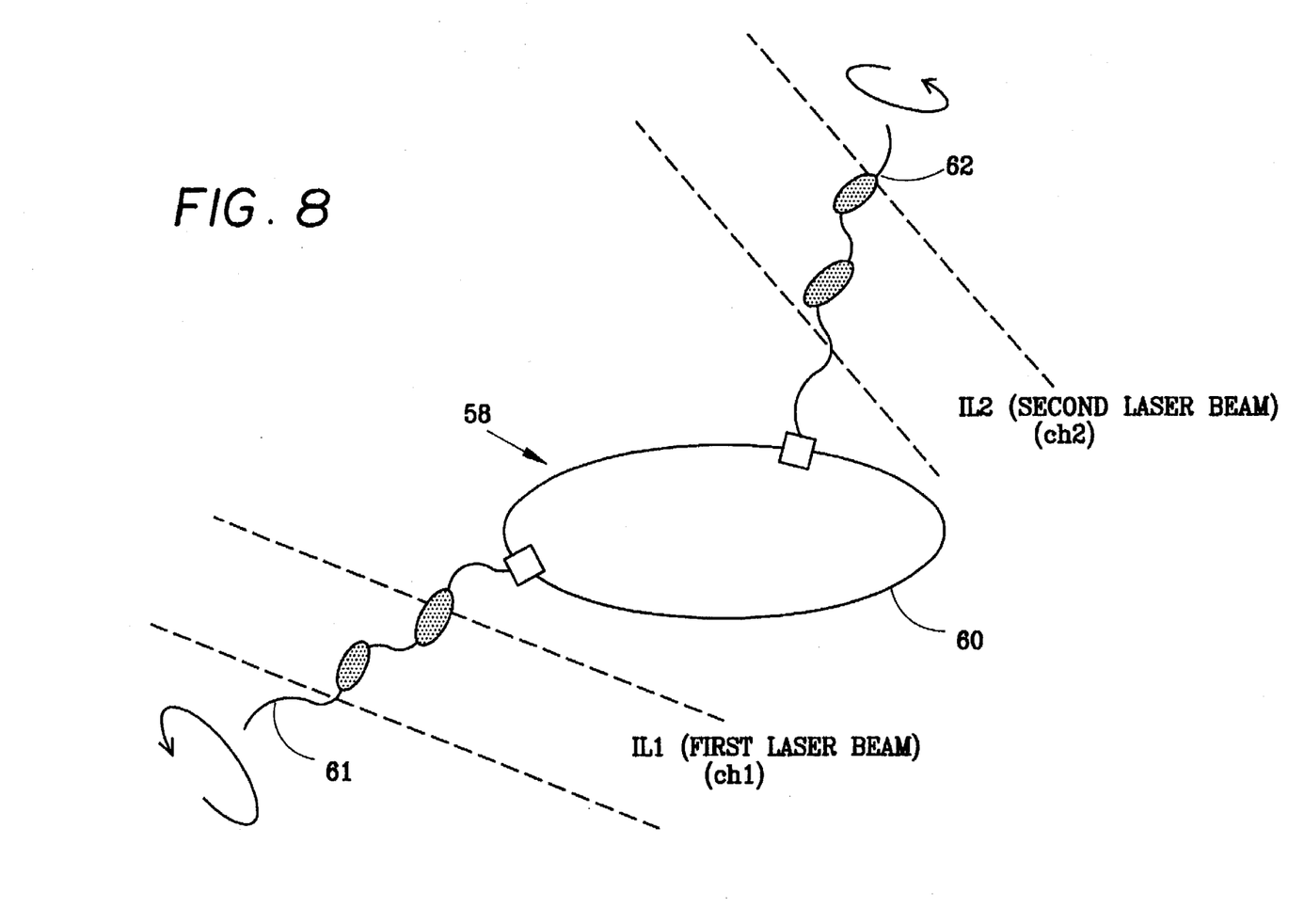
FIG. 8 is a schematic illustration showing an example of measurement in which two flagella of a bacterium are observed using the two-channel microscopic photometry apparatus according to the third embodiment of the present invention.

FIG. 8 is a schematic illustration showing an example of measurement in which two flagella of a bacterium are observed using the two-channel microscopic photometry apparatus according to the third embodiment of the present invention.

FIG. 8 shows a state in which two flagella 61 and 62 of a bacterium 60 attached to a slide glass 58 are illuminated using the first and second laser beams IL1 and IL2. Images of the flagella 61 and 62 thus illuminated are respectively focused on the slits 29 and 39 shown in FIG. 7 so as to measure the amounts of light passing through the slits 29 and 39.

Figure 9:
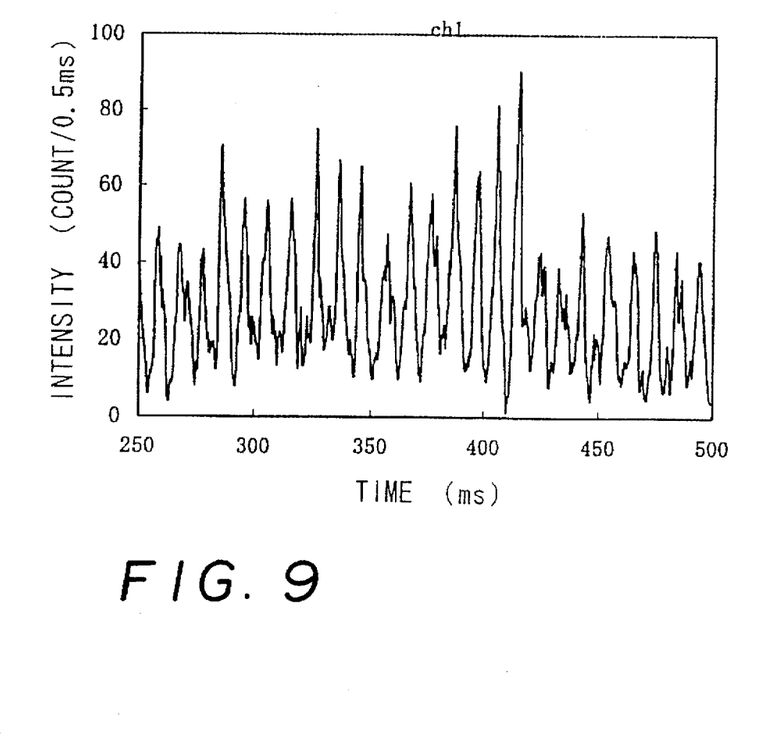
FIG. 9 is a graph showing variation in light intensity as a function of time, which occurs due to rotation of flagella of a bacterium and which is obtained by the photodetector of the first channel of the two-channel microscopic photometry apparatus according to the third embodiment of the present invention.
Figure 10:
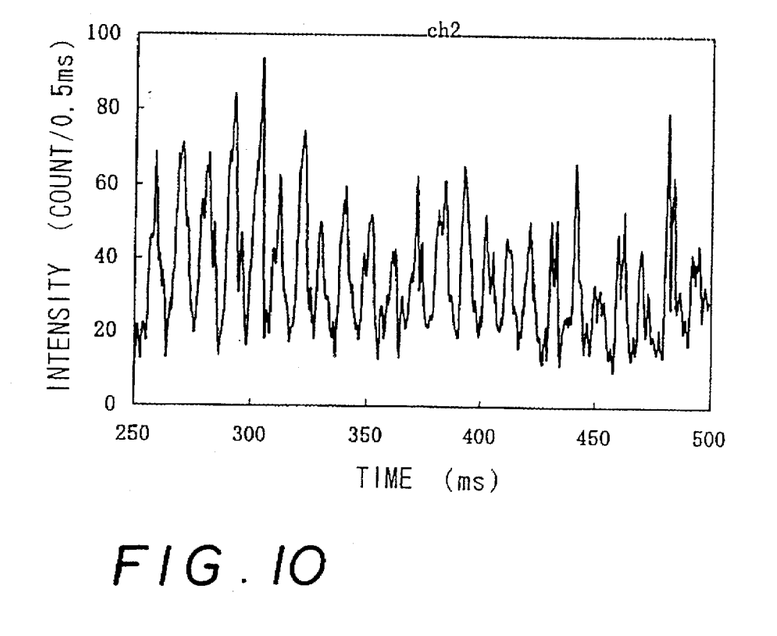
FIG. 10 is a graph showing variation in light intensity as a function of time, which occurs due to rotation of flagella of a bacterium and which is obtained by the photodetector of the second channel of the two-channel microscopic photometry apparatus according to the third embodiment of the present invention.

FIG. 9 is a graph showing variation in light intensity as a function of time, which occurs due to rotation of flagella of a bacterium and which is obtained by the photodetector of the first channel of the two-channel microscopic photometry apparatus according to the third embodiment of the present invention, and FIG. 10 is a graph showing variation in light intensity as a function of time, which occurs due to rotation of flagella of a bacterium and which is obtained by the photodetector of the second channel of the two-channel microscopic photometry apparatus.

In these graphs, the vertical axis represents the light intensity (count/0.5 ms), and the horizontal axis represents time (ms).

The light detected by the first and second photodetectors 31 and 41 shown in FIG. 7 are input to an unillustrated photon-counting system, and data output from this system are printed out using a printer (see Japanese Patent Application Laid-Open No. 3-257349 for information on a single channel laser dark-field microscope which has been proposed by the present inventors and in which a measuring portion is determined by moving the sample stage).

In FIGS. 9 and 10, the period of variation in the quantity of light represents the period of flagellar rotation.

Figure 11:
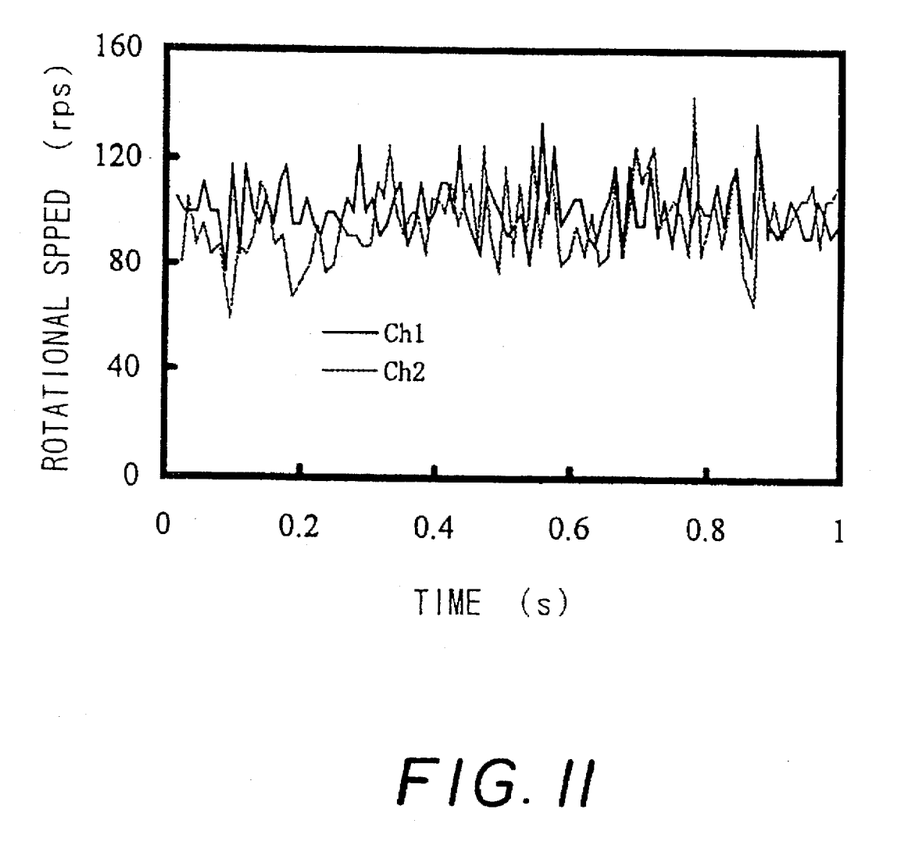
FIG. 11 is a graph showing variations in rotational speed of two flagella of a bacterium as a function of time, which is obtained based on the data detected by the photodetectors of the two-channel microscopic photometry apparatus according to the third embodiment of the present invention.

FIG. 11 is a graph showing variations in rotational speed of two flagella of a bacterium as a function of time, which is obtained based on the data detected by the photodetectors of the two-channel microscopic photometry apparatus according to the third embodiment of the present invention. In FIG. 11, the vertical axis represents the rotational speed (rps) of flagella of a bacterium while the horizontal axis represents time (s). The continuous line shows the first channel (ch1) and the broken line shows the second channel (ch2).

It is apparent that variation in the flagellar rotation as a function of time can be obtained from the graph of FIG. 11.

According to the present invention, correlation of rotation between flagella of a single bacterium and other phenomena can be analyzed.

The present invention is not limited to the above-described embodiments. Numerous modifications and variations of the present invention are possible in light of the spirit of the present invention, and they are not excluded from the scope of the present invention.

What is claimed is:

1. A microscopic photometry apparatus having an optical system for photometry and an optical system for observation, said microscopic photometry apparatus comprising two photometry/observation systems each comprising:

(a) a mirror having a slit for photometry,
  (b) a photodetector for receiving light from said slit for photometry;
  (c) observation means for observing an image of a sample reflected by said mirror;
  (d) an image translating mechanism for translating the image of the sample; and
  (e) an image rotating mechanism for rotating the image of the sample,
  (f) whereby photometry is performed not only for a single point but also simultaneously performed for two selected points of the sample.

2. A microscopic photometry apparatus according to claim 1, wherein two laser beams are simultaneously introduced into a dark-field condenser as illumination light so as to illuminate two very small objects separately, thereby simultaneously measuring scattered light from the two very small objects.

3. A microscopic photometry apparatus according to claim 2, wherein an optical path rotating mechanism is provided at a laser beam introducing section so as to illuminate a sample at an arbitrary angle in a plane in which the sample exists.

* * * * *